United States Patent
Cai et al.

(10) Patent No.: US 12,530,241 B2
(45) Date of Patent: Jan. 20, 2026

(54) CLOUD INSTANCE SCALING METHOD AND RELATED DEVICE THEREOF

(71) Applicant: HUAWEI TECHNOLOGIES CO., LTD., Guangdong (CN)

(72) Inventors: Haomin Cai, Hangzhou (CN); Rui Jing, Hangzhou (CN); Zhongkai Lei, Hangzhou (CN); Jingxiao Lu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 83 days.

(21) Appl. No.: 18/676,628

(22) Filed: May 29, 2024

(65) Prior Publication Data
US 2024/0320055 A1    Sep. 26, 2024

Related U.S. Application Data

(63) Continuation of application No. PCT/CN2022/134647, filed on Nov. 28, 2022.

(30) Foreign Application Priority Data

Nov. 30, 2021 (CN) .......................... 202111450334.5

(51) Int. Cl.
G06F 9/50 (2006.01)
H04L 67/10 (2022.01)

(52) U.S. Cl.
CPC ............ *G06F 9/5072* (2013.01); *H04L 67/10* (2013.01)

(58) Field of Classification Search
CPC .............................. G06F 9/5072; H04L 67/10
See application file for complete search history.

(56) References Cited

U.S. PATENT DOCUMENTS 12,069,128 B2 * 8/2024 Einkauf .................. H04L 41/22
12,223,361 B2 * 2/2025 Boyapalle ............. G06F 9/4856
(Continued)

FOREIGN PATENT DOCUMENTS

CN       111491006 A       8/2020
CN       112783608 A       5/2021
(Continued)

OTHER PUBLICATIONS

Exploring Potential for Non-Disruptive Vertical Auto Scaling and Resource Estimation in Kubernetes. Gourav Rattihalli et al, 2019 IEEE 12th International Conference on Cloud Computing (CLOUD), total 8 pages.

(Continued)

*Primary Examiner* — Nazia Naoreen

(57) ABSTRACT

This application provides a cloud instance scaling method and a related device thereof, to ensure that a service running on a cloud instance is not interrupted when a resource quota of the cloud instance is increased or decreased. The method in this application includes: A first worker node obtains status information of a plurality of cloud instances. The first worker node determines, based on the status information, a to-be-scaled-up cloud instance from the plurality of cloud instances and a quantity of resources required for scale-up. If a quantity of idle resources of the first worker node is greater than or equal to the quantity of resources required for scale-up, the first worker node increases a resource quota of the to-be-scaled-up cloud instance based on the quantity of resources required for scale-up.

20 Claims, 7 Drawing Sheets

(56) References Cited

U.S. PATENT DOCUMENTS

2015/0106520 A1    4/2015  Breitgand et al.
2020/0272526 A1*  8/2020  Bhole ................. G06F 11/3409
2020/0364086 A1*  11/2020  Gavali ................ G06F 11/3414

FOREIGN PATENT DOCUMENTS

| | | |
|---|---|---|
| CN | 113037794 A | 6/2021 |
| CN | 113296880 A | 8/2021 |
| KR | 102172607 B1 | 11/2020 |

OTHER PUBLICATIONS

Aliyun, Challenges and selection considerations encountered by Alibaba Cloud in application expansion and contraction, Dec. 1, 2020, https://developer.aliyun.com/article/779281, 23 pages.
International Search Report and Written Opinion issued in PCT/CN2022/134647, dated Feb. 2, 2023, 8 pages.

\* cited by examiner

CLOUD INSTANCE SCALING METHOD AND RELATED DEVICE THEREOF

CROSS-REFERENCE TO RELATED APPLICATIONS

This application is a continuation of International Application No. PCT/CN2022/134647, filed on Nov. 28, 2022, which claims priority to Chinese Patent Application No. 202111450334.5, filed on Nov. 30, 2021. The disclosures of the aforementioned applications are hereby incorporated by reference in their entireties.

TECHNICAL FIELD

This application relates to the field of cloud technologies, and in particular, to a cloud instance scaling method and a related device thereof.

BACKGROUND

With rapid development of technologies, a cloud service system is increasingly large. The cloud service system usually includes a plurality of worker nodes and a master node. A plurality of dockers are deployed on each worker node, and the master node may perform centralized management on all dockers.

Currently, the cloud service system uses kubernetes as a docker management standard to implement orchestration and deployment, gray scale upgrade and downgrade, and automatic scaling for dockers. In terms of an automatic scaling function, the kubernetes may support two automatic scaling methods: vertical pod (docker group) autoscale (VPA) and horizontal pod autoscale (HPA). In the VPA, the master node may calculate a recommended value of a resource quota of a pod based on a resource utilization rate of the pod in a worker node, and send the recommended value to the worker node. When a pod is created on the worker node, a new resource quota may be set for the pod based on the recommended value (for example, increasing the resource quota of the pod or decreasing the resource quota of the pod, which is equivalent to scale-up or scale-down).

In the preceding process, a time point for modifying the resource quota of the pod can be modified only when the pod is created. When a resource quota of a pod needs to be modified, the worker node has to release the pod and create the pod again to modify the resource quota. As a result, services running on the pod are interrupted.

SUMMARY

Embodiments of this application provide a cloud instance scaling method and a related device thereof, to ensure that a service running on a cloud instance is not interrupted when a resource quota of the cloud instance is increased or decreased.

A first aspect of embodiments of this application provides a cloud instance scaling method. The method is applied to a cloud service system. The cloud service system includes a plurality of worker nodes, and one of the worker nodes is described as an example, and the worker node is referred to as a first worker node. The method includes:

A plurality of cloud instances are deployed on the first worker node. For example, the plurality of cloud instances may be a plurality of dockers. For another example, the plurality of cloud instances may be a plurality of groups of dockers. For still another example, the plurality of cloud instances may be a plurality of virtual machines. For yet another example, the plurality of cloud instances may be a plurality of groups of virtual machines. The first worker node may obtain status information of the plurality of cloud instances, where status information of each cloud instance may indicate a status of a service running on the cloud instance.

After obtaining the status information of the plurality of cloud instances, the first worker node may analyze the plurality of cloud instances one by one based on the status information of the plurality of cloud instances, to determine a to-be-scaled-up cloud instance and a quantity of resources required for scaling up the to-be-scaled-up cloud instance from the plurality of cloud instances.

The first worker node may determine a quantity of idle resources of the first worker node, and detect whether the quantity of idle resources of the first worker node is greater than or equal to a quantity of resources required for scale-up. If the quantity of idle resources of the first worker node is greater than or equal to the quantity of resources required for scale-up, it indicates that the idle resources of the first worker node are sufficient. Therefore, the first worker node may directly perform scale-up processing on the to-be-scaled-up cloud instance, that is, increase a resource quota of the to-be-scaled-up cloud instance based on the quantity of resources required for scale-up. In this way, cloud instances can be scaled up.

It can be learned from the foregoing method that after obtaining the status information of the plurality of cloud instances, the first worker node may determine, based on the status information, the to-be-scaled-up cloud instance from the plurality of cloud instances and the quantity of resources required for scale-up. If the quantity of idle resources of the first worker node is greater than or equal to the quantity of resources required for scale-up, the first worker node may increase the resource quota of the to-be-scaled-up cloud instance based on the quantity of resources required for scale-up. It can be learned from the foregoing process that, this application provides a new cloud instance scale-up mechanism. After determining a to-be-scaled-up cloud instance, the first worker node may increase a resource quota of the to-be-scaled-up cloud instance by modifying a cgroup configuration in real time. This is not perceived by a service running on the to-be-scaled-up cloud instance. Therefore, the service running on the to-be-scaled-up cloud instance is not interrupted.

In a possible implementation, that the first worker node determines, based on the status information, a to-be-scaled-up first cloud instance from the plurality of cloud instances and a quantity of resources required for scale-up includes: the first worker node determines a cloud instance whose status information meets a preset scale-up condition as a to-be-scaled-up cloud instance from the plurality of cloud instances. The first worker node determines the quantity of resources required for scale-up based on the status information of the to-be-scaled-up cloud instance. In the foregoing implementation, for any one of the plurality of cloud instances, the first worker node may detect whether status information of the cloud instance meets the preset scale-up condition. If the status information meets the preset scale-up condition, it is determined that scale-up needs to be performed, that is, the cloud instance is determined as a to-be-scaled-up cloud instance. If the status information does not meet the preset scale-up condition, it is determined that the cloud instance does not need to be scaled up, and the operation ends. After the cloud instance is determined as the to-be-scaled-up cloud instance, a quantity of resources required for scaling up the cloud instance may be further accurately calculated based on the status information of the cloud instance.

In a possible implementation, the cloud service system further includes a second worker node, and the method further includes: If the quantity of idle resources of the first worker node is less than the quantity of resources required for scale-up, the first worker node determines a to-be-migrated cloud instance from the plurality of cloud instances, where a priority of a service running on the to-be-migrated cloud instance is lower than a preset priority. The first worker node migrates the to-be-migrated cloud instance to the second worker node, to update the quantity of idle resources of the first worker node. If an updated quantity of idle resources of the first worker node is greater than or equal to the quantity of the resources required for scale-up, the first worker node increases a resource quota of the to-be-scaled-up cloud instance based on the quantity of resources required for scale-up. In the foregoing implementation, if the quantity of idle resources of the first worker node is less than the quantity of resources required for scaling up the cloud instance, it indicates that the idle resources of the first worker node are insufficient. The first worker node may determine at least one to-be-migrated cloud instance from the plurality of cloud instances of the first worker node. Priorities of services running on these to-be-migrated cloud instances are lower than the preset priority (that is, the priorities of services running on these cloud instances are usually lower). Therefore, the to-be-migrated cloud instances may be migrated to the second worker node. In this case, resources that are in the first worker node and that are allocated to the to-be-migrated cloud instances are released, and become new idle resources, so that the quantity of idle resources of the first worker node is updated (that is, the quantity of idle resources of the first worker node is increased). Then, the first worker node may detect whether an updated quantity of idle resources of the first worker node is greater than or equal to the quantity of resources required for scale-up. If the updated quantity of idle resources of the first worker node is greater than or equal to the quantity of resources required for scaling up the cloud instance (the to-be-scaled-up cloud instance), it indicates that the updated idle resources of the first worker node are sufficient, and these resources can be directly used to scale up the cloud instance. Therefore, the first worker node may increase the resource quota of the cloud instance to scale up the cloud instance based on the quantity of resources required for scaling up the cloud instance.

In a possible implementation, the cloud service system further includes a third worker node, and the method further includes: If the updated quantity of idle resources of the first worker node is less than the quantity of resources required for scale-up, the first worker node detects a type of a service running on the to-be-scaled-up cloud instance. If the service running on the to-be-scaled-up cloud instance is a stateless application, the first worker node creates a new cloud instance on the third worker node, where the new cloud instance and the to-be-scaled-up cloud instance are jointly used to run the stateless application. If the service running on the to-be-scaled-up cloud instance is a stateful application, the first worker node migrates the to-be-scaled-up cloud instance to the third worker node. In the foregoing implementation, if the updated quantity of idle resources of the first worker node is less than the quantity of resources required for scaling up the cloud instance (the to-be-scaled-up cloud instance), it indicates that the updated quantity of idle resources of the first worker node is insufficient. The first worker node may first detect a type of a service (which may also be understood as an application running on the cloud instance) running on the cloud instance, to perform corresponding processing based on the type of the service running on the cloud instance. If the service running on the cloud instance is a stateless application, the first worker node may apply for creating a new cloud instance on the third worker node. In this case, the cloud instance and the new cloud instance may jointly run a service originally running on the cloud instance, which is equivalent to implementing scale-up. If the service running on the cloud instance is a stateful application, a node agent may migrate the cloud instance to the third worker node, where a quantity of idle resources of the third worker node is greater than or equal to the quantity of resources required for scaling up the cloud instance. In this case, after the cloud instance is migrated to the third worker node, a resource quota of the cloud instance may be increased, which is equivalent to completing scale-up.

In a possible implementation, the status information includes at least one of the following: a resource utilization rate, a load degree, and a service success rate. It can be learned that the status information of the cloud instance is related to service logic of the cloud instance.

In a possible implementation, the preset scale-up condition includes at least one of the following: the resource utilization rate is greater than or equal to a preset first resource utilization rate, the load degree is greater than or equal to a preset first load degree, and the service success rate is less than a preset first service success rate. In VPA, whether a cloud instance needs to be scaled up is detected only based on a resource utilization rate of the cloud instance, and a service requirement cannot be deeply understood. A plurality of detections are required to accurately determine whether a cloud instance needs to be scaled up, which consumes a relatively long time in detection. In the foregoing implementation, whether the cloud instance needs to be scaled up may be detected based on the status information of the cloud instance. The status information of the cloud instance includes information such as a resource utilization rate, a load degree, and a service success rate of the cloud instance, and the status information of the cloud instance is related to service logic of the cloud instance, so that a service requirement can be reflected. Therefore, the worker node can sense the service requirement in real time based on the status information of the cloud instance, and accurately detect, based on the service requirement, whether the cloud instance needs to be scaled up. This effectively reduces a quantity of detection times and shortens detection duration.

In a possible implementation, a manner of migrating the to-be-scaled-up cloud instance to the third worker node is a cold migration or a hot migration.

In a possible implementation, the cloud service system further includes a master node, and after the first worker node increases the resource quota of the to-be-scaled-up cloud instance, the method further includes: The first worker node sends the resource quota of the to-be-scaled-up cloud instance to the master node. In the foregoing implementation, after increasing the resource quota of the to-be-scaled-up cloud instance, the first worker node may send the increased resource quota of the cloud instance to the master node. Therefore, the master node and the first worker node may synchronize the resource quota of the cloud instance, so that global (namely, the entire cloud service system) resource configuration information is accurate and consistent.

A second aspect of embodiments of this application provides a cloud instance scale-down method. The method is applied to a cloud service system. The cloud service system includes a first worker node, and the method includes:

A plurality of cloud instances are deployed on the first worker node. For example, the plurality of cloud instances may be a plurality of dockers. For another example, the plurality of cloud instances may be a plurality of groups of dockers. For still another example, the plurality of cloud instances may be a plurality of virtual machines. For yet another example, the plurality of cloud instances may be a plurality of groups of virtual machines. The first worker node may obtain status information of the plurality of cloud instances, where status information of each cloud instance may indicate a status of a service running on the cloud instance.

After obtaining the status information of the plurality of cloud instances, the first worker node may analyze the plurality of cloud instances one by one based on the status information of the plurality of cloud instances, to determine a to-be-scaled-down cloud instance from the plurality of cloud instances.

After determining the to-be-scaled-down cloud instance, the first worker node may determine non-idle resources and idle resources of the to-be-scaled-down cloud instance, release the idle resources of the to-be-scaled-down cloud instance, and calculate a size of the released resources, that is, determine a quantity of released idle resources of the to-be-scaled-down cloud instance. In this case, the first worker node may decrease a resource quota of the to-be-scaled-down cloud instance based on the quantity of idle resources of the to-be-scaled-down cloud instance, to implement scale-down of the cloud instance.

It can be learned from the foregoing method that after obtaining the status information of the plurality of cloud instances, the first worker node may determine the to-be-scaled-down cloud instance from the plurality of cloud instances based on the status information. Then, the first worker node releases the idle resources of the to-be-scaled-down cloud instance, and determines the quantity of released idle resources of the to-be-scaled-down cloud instance. Finally, the first worker node may decrease the resource quota of the to-be-scaled-down cloud instance based on the quantity of idle resources of the to-be-scaled-down cloud instance. It can be learned from the foregoing process that, this application provides a new cloud instance scale-down mechanism. After determining a to-be-scaled-down cloud instance, the first worker node may decrease a resource quota of the to-be-scaled-down cloud instance by modifying a cgroup configuration in real time. This is not perceived by a service running on the to-be-scaled-down cloud instance. Therefore, the service running on the to-be-scaled-down cloud instance is not interrupted.

In a possible implementation, that the first worker node determines a to-be-scaled-down cloud instance from the plurality of cloud instances based on the status information includes: The first worker node determines a cloud instance whose status information meets a preset scale-down condition as a to-be-scaled-down cloud instance from the plurality of cloud instances. In the foregoing implementation, for any one of the plurality of cloud instances, the first worker node may detect whether status information of the cloud instance meets the preset scale-down condition. If the status information meets the preset scale-down condition, it is determined that scale-down needs to be performed, that is, the cloud instance is determined as a to-be-scaled-down cloud instance. If the status information does not meet the preset scale-down condition, it is determined that the cloud instance does not need to be scaled down, and the operation ends.

In a possible implementation, the status information includes at least one of the following: a resource utilization rate, a load degree, and a service success rate. It can be learned that the status information of the cloud instance is related to service logic of the cloud instance.

In a possible implementation, the preset scale-down condition includes at least one of the following: the resource utilization rate is less than a preset second resource utilization rate, the load degree is less than a preset second load degree, and the service success rate is greater than or equal to a preset second service success rate. In VPA, whether a cloud instance needs to be scaled down is detected only based on a resource utilization rate of the cloud instance, and a service requirement cannot be deeply understood. A plurality of detections are required to accurately determine whether a cloud instance needs to be scaled down, which consumes a relatively long time in detection. In the foregoing implementation, whether the cloud instance needs to be scaled down may be detected based on the status information of the cloud instance. The status information of the cloud instance includes information such as a resource utilization rate, a load degree, and a service success rate of the cloud instance, and the status information of the cloud instance is related to service logic of the cloud instance, so that a service requirement can be reflected. Therefore, the worker node can sense the service requirement in real time based on the status information of the cloud instance, and accurately detect, based on the service requirement, whether the cloud instance needs to be scaled down. This effectively reduces a quantity of detection times and shortens detection duration.

In a possible implementation, the cloud service system further includes a master node, and after the first worker node decreases the resource quota of the to-be-scaled-down cloud instance based on the quantity of idle resources of the to-be-scaled-down cloud instance, the method further includes: The first worker node sends the resource quota of the to-be-scaled-down cloud instance to the master node. In the foregoing implementation, after decreasing the resource quota of the cloud instance, the first worker node may send the decreased resource quota of the cloud instance to the master node. Therefore, the master node and the first worker node may synchronize the resource quota of the cloud instance, so that global (namely, the entire cloud service system) resource configuration information is accurate and consistent.

A third aspect of embodiments of this application provides a worker node, where the worker node is used as a first worker node. The first worker node is disposed in a cloud service system, a plurality of cloud instances are deployed on the first worker node, and the first worker node includes: an obtaining module, configured to obtain status information of the plurality of cloud instances; a first determining module, configured to determine, based on the status information, a to-be-scaled-up cloud instance from the plurality of cloud instances and a quantity of resources required for scale-up; and a first adjustment module, configured to: if a quantity of idle resources of the first worker node is greater than or equal to the quantity of resources required for scale-up, increase a resource quota of the to-be-scaled-up cloud instance based on the quantity of resources required for scale-up.

It can be learned from the foregoing worker node that after obtaining the status information of the plurality of cloud instances, the first worker node may determine, based on the status information, the to-be-scaled-up cloud instance from the plurality of cloud instances and the quantity of resources required for scale-up. If the quantity of idle resources of the first worker node is greater than or equal to the quantity of resources required for scale-up, the first worker node may increase the resource quota of the to-be-scaled-up cloud instance based on the quantity of resources required for scale-up. It can be learned from the foregoing process that, this application provides a new cloud instance scale-up mechanism. After determining a to-be-scaled-up cloud instance, the first worker node may increase a resource quota of the to-be-scaled-up cloud instance by modifying a cgroup configuration in real time. This is not perceived by a service running on the to-be-scaled-up cloud instance. Therefore, the service running on the to-be-scaled-up cloud instance is not interrupted.

In a possible implementation, the first determining module is configured to: determine a cloud instance whose status information meets a preset scale-up condition as a to-be-scaled-up cloud instance from the plurality of cloud instances; and determine the quantity of resources required for scale-up based on the status information of the to-be-scaled-up cloud instance.

In a possible implementation, the cloud service system further includes a second worker node, and the first worker node further includes: a second determining module, configured to: if the quantity of idle resources of the first worker node is less than the quantity of resources required for scale-up, determine a to-be-migrated cloud instance from the plurality of cloud instances, where a priority of a service running on the to-be-migrated cloud instance is lower than a preset priority; a first migration module, configured to migrate the to-be-migrated cloud instance to the second worker node, to update the quantity of idle resources of the first worker node; and a second adjustment module, configured to: if an updated quantity of idle resources of the first worker node is greater than or equal to the quantity of resources required for scale-up, increase a resource quota of the to-be-scaled-up cloud instance based on the quantity of resources required for scale-up.

In a possible implementation, the cloud service system further includes a third worker node, and the first worker node further includes: a detection module, configured to: if the updated quantity of idle resources of the first worker node is less than the quantity of resources required for scale-up, detect, by the first worker node, a type of a service running on the to-be-scaled-up cloud instance; a creation module, configured to: if the service running on the to-be-scaled-up cloud instance is a stateless application, create a new cloud instance on the third worker node, where the new cloud instance and the to-be-scaled-up cloud instance are jointly used to run the stateless application; and a second migration module, configured to: if the service running on the to-be-scaled-up cloud instance is a stateful application, migrate the to-be-scaled-up cloud instance to the third worker node.

In a possible implementation, the status information includes at least one of the following: a resource utilization rate, a load degree, and a service success rate.

In a possible implementation, the preset scale-up condition includes at least one of the following: the resource utilization rate is greater than or equal to a preset first resource utilization rate, the load degree is greater than or equal to a preset first load degree, and the service success rate is less than a preset first service success rate.

In a possible implementation, the foregoing migration is a cold migration or a hot migration.

In a possible implementation, the cloud service system further includes a master node, and the first worker node further includes a feedback module, configured to send the resource quota of the to-be-scaled-up cloud instance to the master node.

A fourth aspect of embodiments of this application provides a worker node, where the worker node is used as a first worker node. The first worker node is disposed in a cloud service system, a plurality of cloud instances are deployed on the first worker node, and the first worker node includes: an obtaining module, configured to obtain status information of the plurality of cloud instances; a determining module, configured to determine a to-be-scaled-down cloud instance from the plurality of cloud instances based on the status information; a releasing module, configured to release idle resources of the to-be-scaled-down cloud instance, and determine a quantity of released idle resources of the to-be-scaled-down cloud instance; and an adjustment module, configured to decrease a resource quota of the to-be-scaled-down cloud instance based on the quantity of idle resources of the to-be-scaled-down cloud instance.

It can be learned from the foregoing worker node that after obtaining the status information of the plurality of cloud instances, the first worker node may determine the to-be-scaled-down cloud instance from the plurality of cloud instances based on the status information. Then, the first worker node releases the idle resources of the to-be-scaled-down cloud instance, and determines the quantity of released idle resources of the to-be-scaled-down cloud instance. Finally, the first worker node may decrease the resource quota of the to-be-scaled-down cloud instance based on the quantity of idle resources of the to-be-scaled-down cloud instance. It can be learned from the foregoing process that, this application provides a new cloud instance scale-down mechanism. After determining a to-be-scaled-down cloud instance, the first worker node may decrease a resource quota of the to-be-scaled-down cloud instance by modifying a cgroup configuration in real time. This is not perceived by a service running on the to-be-scaled-down cloud instance. Therefore, the service running on the to-be-scaled-down cloud instance is not interrupted.

In a possible implementation, the determining module is configured to determine a cloud instance whose status information meets a preset scale-down condition as a to-be-scaled-down cloud instance from the plurality of cloud instances.

In a possible implementation, the status information includes at least one of the following: a resource utilization rate, a load degree, and a service success rate.

In a possible implementation, the preset scale-down condition includes at least one of the following: the resource utilization rate is less than a preset second resource utilization rate, the load degree is less than a preset second load degree, and the service success rate is greater than or equal to a preset second service success rate.

In a possible implementation, the cloud service system further includes a master node, and the first worker node further includes a feedback module, configured to send the resource quota of the to-be-scaled-down cloud instance to the master node.

A fifth aspect of embodiments of this application provides a worker node. The worker node includes a memory and a processor. The memory stores code. The processor is configured to execute the code. When the code is executed, the worker node performs the method according to any one of the first aspect, the possible implementations of the first aspect, the second aspect, or the possible implementations of the second aspect.

A sixth aspect of embodiments of this application provides a computer storage medium. The computer storage medium stores one or more instructions. When the instructions are executed by one or more computers, the one or more computers are enabled to perform the method according to any one of the first aspect, the possible implementations of the first aspect, the second aspect, or the possible implementations of the second aspect.

A seventh aspect of embodiments of this application provides a computer program product. The computer program product stores instructions. When the instructions are executed by a computer, the computer is enabled to perform the method according to any one of the first aspect, the possible implementations of the first aspect, the second aspect, or the possible implementations of the second aspect.

In this embodiment of this application, after obtaining the status information of the plurality of cloud instances, the first worker node may determine the to-be-scaled-down cloud instance from the plurality of cloud instances based on the status information. Then, the first worker node releases the idle resources of the to-be-scaled-down cloud instance, and determines the quantity of released idle resources of the to-be-scaled-down cloud instance. Finally, the first worker node may decrease the resource quota of the to-be-scaled-down cloud instance based on the quantity of idle resources of the to-be-scaled-down cloud instance. It can be learned from the foregoing process that, this application provides a new cloud instance scale-down mechanism. After determining a to-be-scaled-down cloud instance, the first worker node may decrease a resource quota of the to-be-scaled-down cloud instance by modifying a cgroup configuration in real time. This is not perceived by a service running on the to-be-scaled-down cloud instance. Therefore, the service running on the to-be-scaled-down cloud instance is not interrupted.

In addition, in this embodiment of this application, after obtaining the status information of the plurality of cloud instances, the first worker node may determine the to-be-scaled-down cloud instance from the plurality of cloud instances based on the status information. Then, the first worker node releases the idle resources of the to-be-scaled-down cloud instance, and determines the quantity of released idle resources of the to-be-scaled-down cloud instance. Finally, the first worker node may decrease the resource quota of the to-be-scaled-down cloud instance based on the quantity of idle resources of the to-be-scaled-down cloud instance. It can be learned from the foregoing process that, this application provides a new cloud instance scale-down mechanism. After determining a to-be-scaled-down cloud instance, the first worker node may decrease a resource quota of the to-be-scaled-down cloud instance by modifying a cgroup configuration in real time. This is not perceived by a service running on the to-be-scaled-down cloud instance. Therefore, the service running on the to-be-scaled-down cloud instance is not interrupted.

DESCRIPTION OF EMBODIMENTS

Embodiments of this application provide a cloud instance scaling method and a related device thereof, to ensure that a service running on a cloud instance is not interrupted when a resource quota of the cloud instance is increased or decreased.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

With rapid development of technologies, a scale of a cloud service system is increasingly large. The cloud service system usually includes a plurality of worker nodes and a master node. A plurality of cloud instances are deployed on each worker node, and the master node may perform centralized management on all cloud instances.

Figure 1:
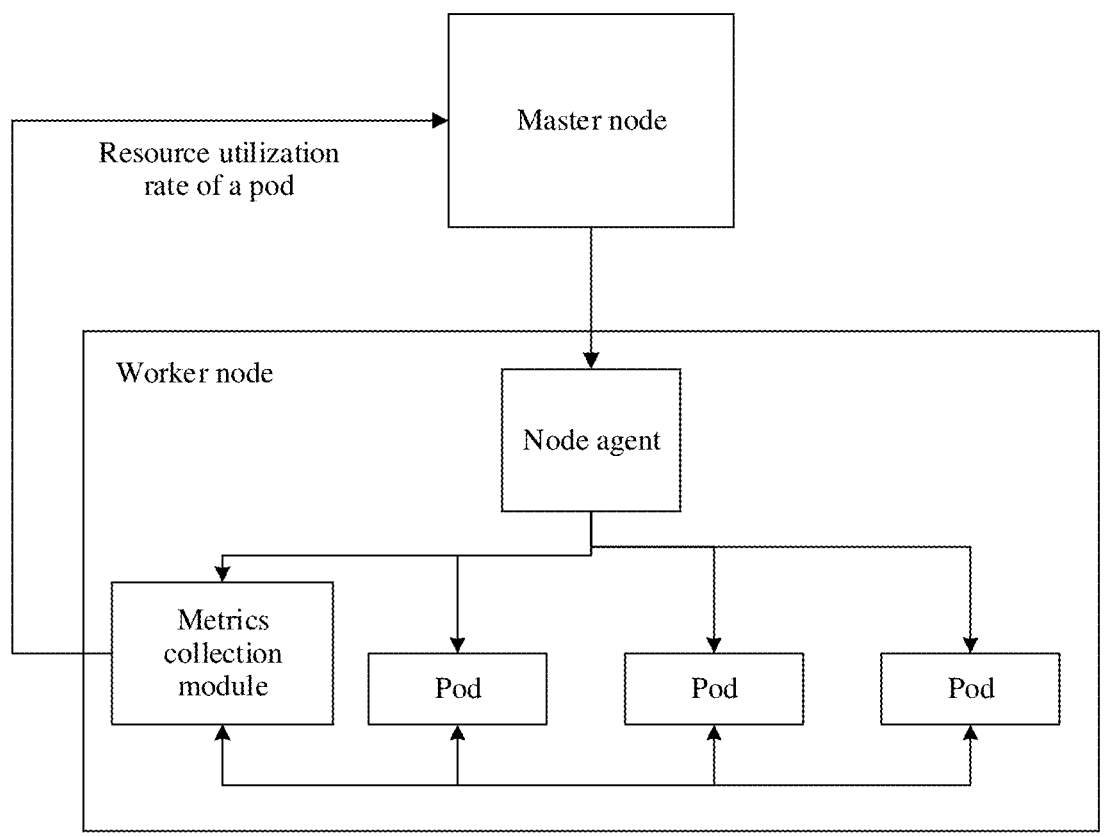
FIG. 1 is a schematic diagram of VPA.

For ease of description, a cloud instance is used as a docker. Currently, the cloud service system uses kubernetes as a docker management standard to implement orchestration and deployment, gray scale upgrade and downgrade, and automatic scaling for dockers. In terms of an automatic scaling function, the kubernetes supports two automatic scaling methods: VPA and HPA. As shown in FIG. 1 (FIG. 1 is a schematic diagram of VPA), in the VPA, the master node may calculate a recommended value of a resource quota of a pod based on a resource utilization rate of the pod in a worker node, and send the recommended value to the worker node. When creating a pod, the worker node may set a new resource quota for the pod based on the recommended value, for example, increase a resource quota of the pod (that is, increase a quantity of resources allocated to the pod, that is, scale up the pod) or decrease a resource quota of the pod (that is, decrease a quantity of resources allocated to the pod, that is, scale down the pod).

In the preceding process, a time point for modifying the resource quota of the pod can be modified only when the pod is created. When a resource quota of a pod needs to be modified, the worker node has to release the pod and create the pod again to modify the resource quota. As a result, services running on the pod are interrupted.

Figure 2:
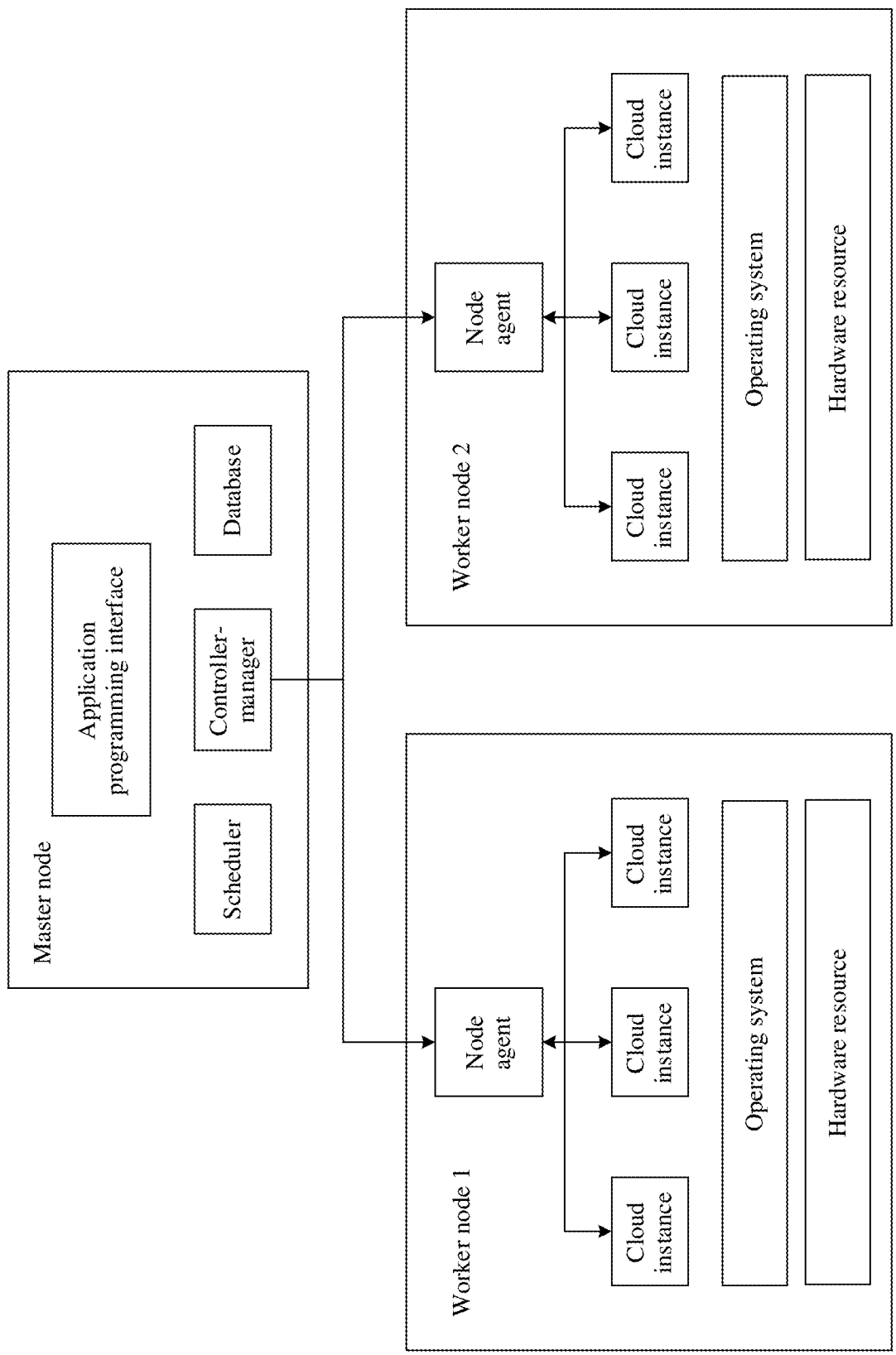
FIG. 2 is a schematic diagram of a structure of a cloud service system according to an embodiment of this application.

To resolve the foregoing problem, embodiments of this application provide a cloud instance scaling method. The method may be applied to a cloud service system shown in FIG. 2 (FIG. 2 is a schematic diagram of a structure of a cloud service system according to an embodiment of this application). Cloud scenarios to which the system is applicable include scenarios such as a public cloud, a private cloud, and a hybrid cloud. The system includes a master node and a plurality of worker nodes, and the master node performs centralized management on the plurality of worker nodes. The following separately describes the master node and the plurality of worker nodes.

A master node is usually an independent physical server (also referred to as a network device). There are a plurality of functional modules that are disposed in the master node, which are an application programming interface (API), a scheduler (scheduler), a controller-manager, and a database (DB). The API can be considered as an interface of the cloud service system. A user can create a cloud instance on a worker node through the API. The scheduler may be configured to schedule a cloud instance to a proper node. The scheduler is usually a replaceable component, and a form of the scheduler may be set based on requirements of different vendors. This is not limited herein. The controller-manager is configured to implement functions such as resource management of each worker node and each cloud instance in the cloud service system. The database is used to store configuration information in the cloud service system, for example, resource quotas of each cloud instance.

A worker node is usually an independent physical server. Based on a virtualization technology, a node agent (kubelet) and a plurality of cloud instances may be deployed on an operating system of the worker node. The operating system is configured to implement hardware resource management of the worker node. As an agent process on a worker node, the node agent is configured to manage all cloud instances on the worker node, including life cycle management, resource configuration, and the like. A cloud instance may be presented in a plurality of forms. For example, a cloud instance may be a virtual machine (VM). For another example, a cloud instance may be a docker. For still another example, a cloud instance may be a group of virtual machines. For yet another example, a cloud instance may be a group of dockers (which may also be referred to as a pod). It may be understood that the worker node includes specific hardware resources (a computing resource, a storage resource, a network resource, and the like). The node agent may set a resource quota for each cloud instance, the resource quota of each cloud instance is a quantity of resources allocated to the cloud instance (including a quantity of computing resources, a quantity of storage resources, a quantity of network resources, and the like), and the node agent may manage and adjust resource quotas of all cloud instances.

Figure 3:
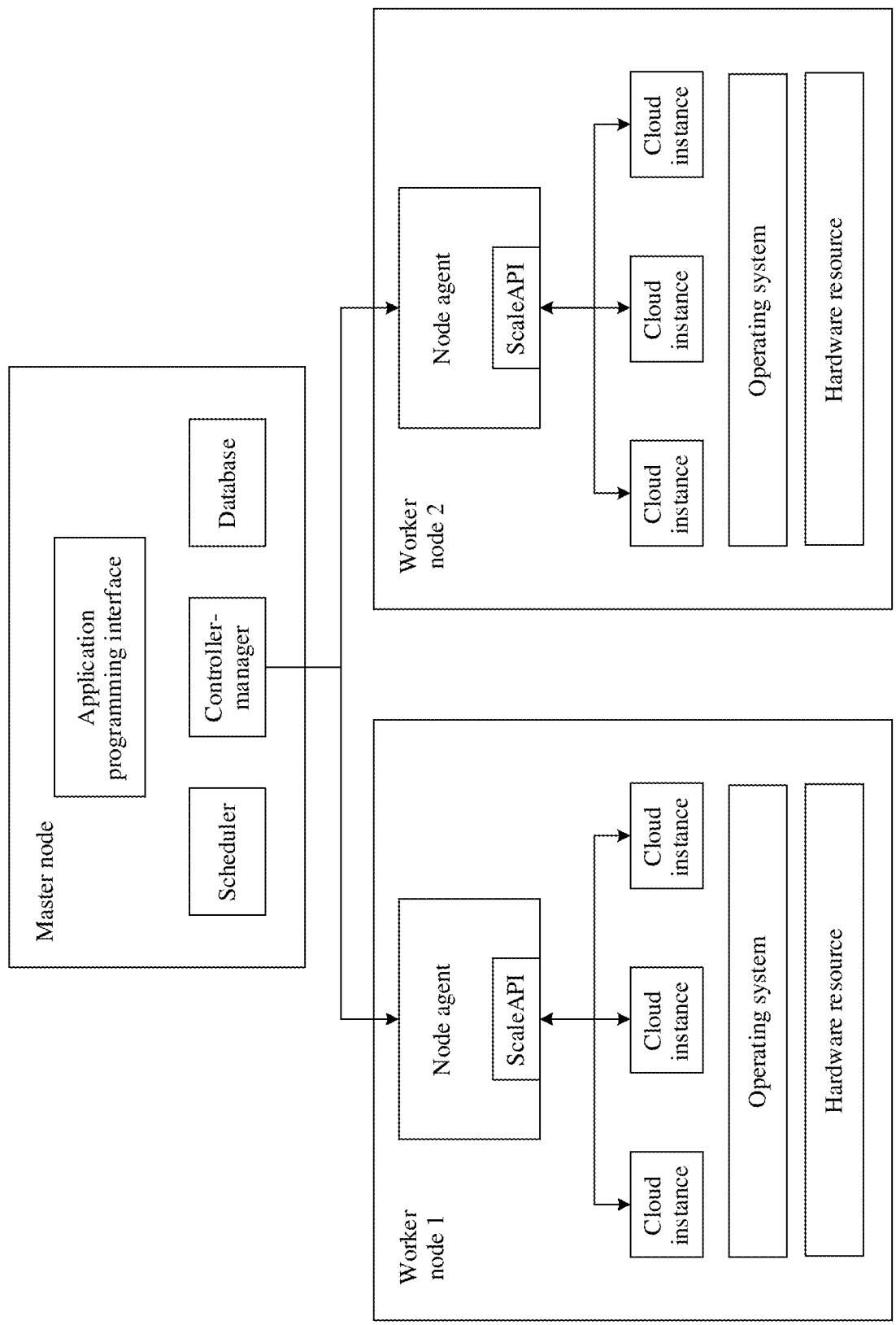
FIG. 3 is a schematic diagram of another structure of a cloud service system according to an embodiment of this application.

It should be noted that, as shown in FIG. 3 (FIG. 3 is a schematic diagram of another structure of a cloud service system according to an embodiment of this application), for a worker node, a scaleAPI is disposed on a node agent of the worker node for invoking by a cloud instance of the worker node, and a bidirectional channel is established between the node agent of the worker node and the cloud instance of the worker node. Therefore, the node agent and the cloud instance can communicate with each other. Specifically, the cloud instance of the worker node may determine, based on status information of the cloud instance, whether scaling needs to be performed. After determining that scaling needs to be performed, the cloud instance initiates an automatic scaling request to the node agent of the worker node, so that the node agent of the worker node performs scaling on the cloud instance of the worker node based on the request.

It should be noted that the scaleAPI and implementation are added to the node agent. This part requires intrusive modification of a node agent function or development of a plug-in. The bidirectional channel between the node agent and the cloud instance does not require intrusive modification and only needs to configure a related network channel.

Figure 4A:
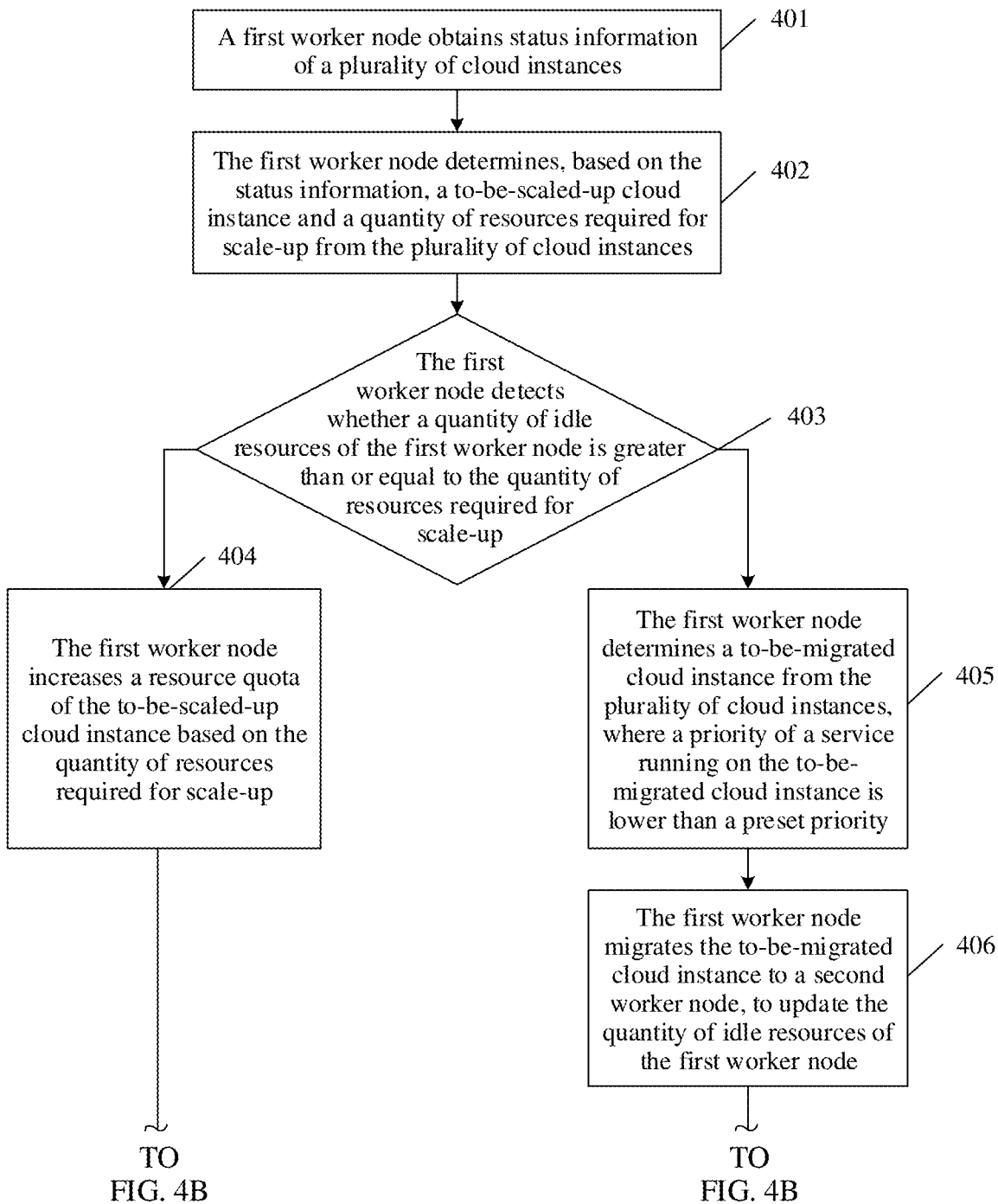
FIG. 4A and FIG. 4B are schematic flowcharts of a cloud instance scale-up method according to an embodiment of this application.
Figure 4B:
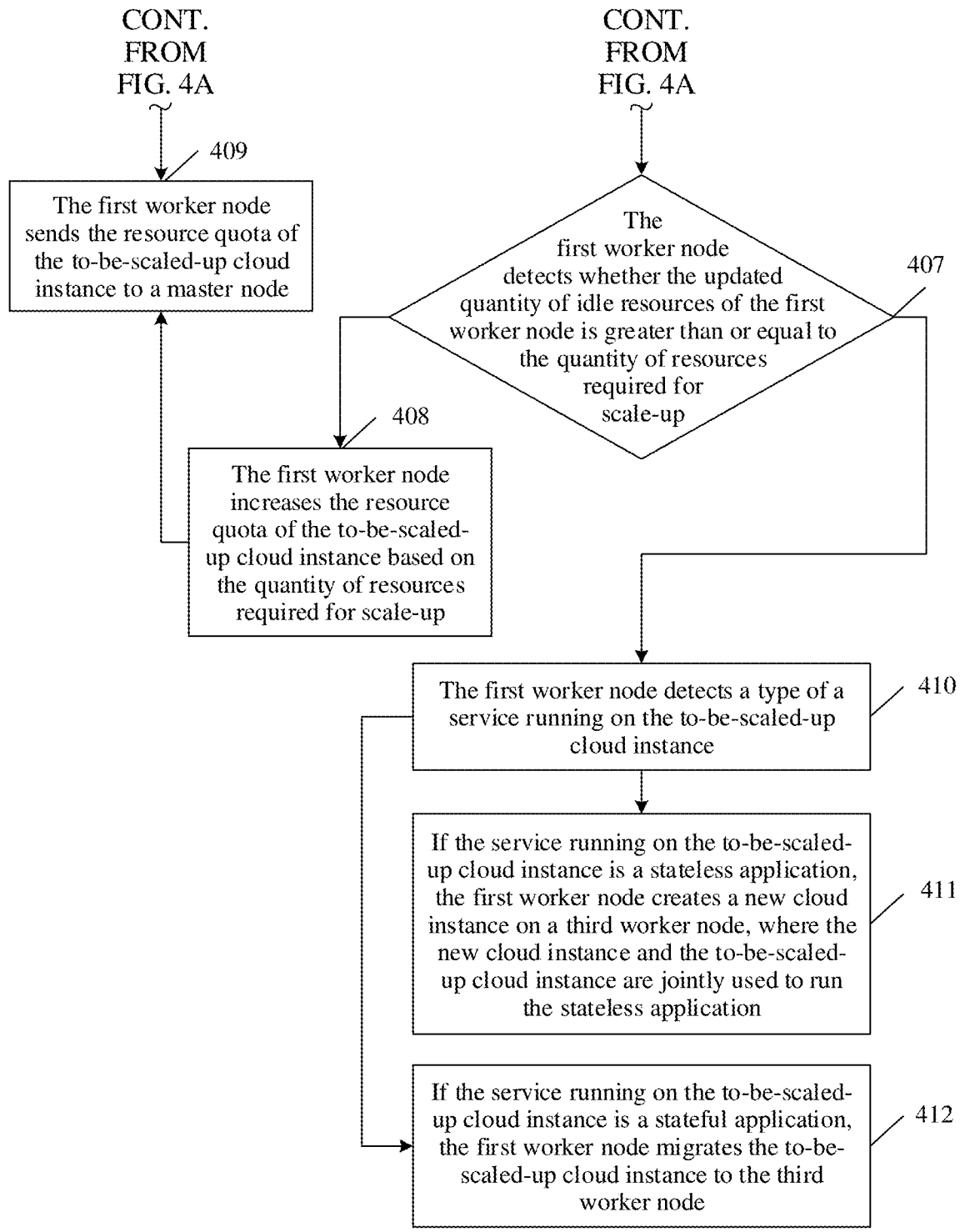

To further understand the foregoing scaling process, the following further describes the process from two aspects: scale-up of a cloud instance and scale-down of a cloud instance. A cloud instance scale-up process is first described. FIG. 4A and FIG. 4B are schematic flowcharts of a cloud instance scale-up method according to an embodiment of this application. It should be noted that the method may be applied to the cloud service system shown in FIG. 2 or FIG. 3. The method may be executed by any one of the plurality of worker nodes in the cloud service system. The worker node is referred to as a first worker node below. As shown in FIG. 4A, the method includes the following steps.

401: A first worker node obtains status information of a plurality of cloud instances.
  402: The first worker node determines, based on the status information, a to-be-scaled-up cloud instance from the plurality of cloud instances and a quantity of resources required for scale-up.

In this embodiment, a plurality of cloud instances are deployed on the first worker node. Any cloud instance may periodically obtain status information of the cloud instance, to determine, based on the status information of the cloud instance, whether scale-up needs to be performed. The period is usually a second-level time period.

Further, the status information of the cloud instance may include at least one of the following: a resource utilization rate of the cloud instance, a load degree of the cloud instance, and a service success rate of the cloud instance.

Further, the resource utilization rate of the cloud instance may include at least one of the following: a central processing unit (CPU) usage of the cloud instance, a memory usage of the cloud instance, a quantity of input/output operations per second (IOPS) during storage of the cloud instance, network IOPS of the cloud instance, and the like.

Further, the load degree of the cloud instance may include at least one of the following: a task response time of the cloud instance, a task processing delay of the cloud instance, a database indicator of the cloud instance, a message queue indicator of the cloud instance, a task queue length of the cloud instance, and the like.

Further, the service success rate of the cloud instance may include at least one of the following: a task completion rate of the cloud instance, a message transmission success rate of the cloud instance, and the like.

Specifically, the cloud instance may determine, in the following manner, whether scale-up needs to be performed:

The cloud instance may detect whether the status information of the cloud instance meets a preset scale-up condition. If the status information of the cloud instance meets the preset scale-up condition, it is determined that scale-up needs to be performed, that is, the cloud instance is determined as a to-be-scaled-up cloud instance. If the status information of the cloud instance does not meet the preset scale-up condition, it is determined that scale-up does not need to be performed, and the operation ends.

That the status information of the cloud instance meets the preset scale-up condition may include at least one of the following cases: the resource utilization rate of the cloud instance is greater than or equal to a preset first resource utilization rate, the load degree of the cloud instance is greater than or equal to a preset first load degree, and the service success rate of the cloud instance is less than a preset first service success rate. It should be noted that the preset first resource utilization rate may be understood as a resource utilization rate threshold that meets a scale-up requirement, the preset first load degree may be understood as a load degree threshold that meets the scale-up requirement, and the preset first service success rate may be understood as a service success rate threshold that meets the scale-up requirement. Values of the three thresholds may be set based on an actual requirement, and are not limited herein.

For example, it is assumed that the status information of the cloud instance is a task response time of the cloud instance, and correspondingly, the preset first load degree is a preset response time threshold. In addition, the task response time of the cloud instance is 3 s, and the preset response time threshold is 1 s. It can be learned that the task response time of the cloud instance is greater than the preset response time threshold. Therefore, it is determined that the cloud instance needs to be scaled up. For another example, it is assumed that the status information of the cloud instance is the memory usage of the cloud instance, and correspondingly, the preset first resource utilization rate is a preset memory usage threshold. In addition, the memory usage of the cloud instance is 8 G, and the preset memory usage threshold is 1 G. It can be learned that the memory usage of the cloud instance is greater than the preset memory usage threshold. Therefore, it is determined that the cloud instance may need to be scaled up.

If it is determined that the cloud instance needs to be scaled up, the cloud instance may determine a quantity of resources required for scaling up the cloud instance based on the status information of the cloud instance. For example, the cloud instance may determine, based on a task queue length of the cloud instance, a quantity of computing resources, a quantity of storage resources, and a quantity of network resources that are required for scaling up the cloud instance.

403: The first worker node detects whether a quantity of idle resources of the first worker node is greater than or equal to the quantity of resources required for scale-up.

After determining that scale-up needs to be performed and a quantity of resources required for scaling up the cloud instance, the cloud instance may initiate a scale-up request to a node agent of the first worker node. After receiving the scale-up request from the cloud instance, the node agent may parse the request, to determine that the cloud instance is a to-be-scaled-up cloud instance and determine a quantity of resources required for scaling up the cloud instance.

In this case, the node agent may detect whether the quantity of idle resources (namely, a quantity of local unused resources of the first worker node) of the first worker node is greater than or equal to the quantity of resources required for scaling up the cloud instance. If the quantity of idle resources of the first worker node is greater than or equal to the quantity of resources required for scaling up the cloud instance, step 404 is performed. If the quantity of idle resources of the first worker node is less than the quantity of resources required for scaling up the cloud instance, step 405 is performed.

404: If the quantity of idle resources of the first worker node is greater than or equal to the quantity of resources required for scale-up, the first worker node increases a resource quota of the to-be-scaled-up cloud instance based on the quantity of resources required for scale-up.

If the quantity of idle resources of the first worker node is greater than or equal to the quantity of resources required for scaling up the cloud instance, it indicates that the idle resources of the first worker node are sufficient, and the cloud instance may be directly scaled up by using the resources. Therefore, the node agent may increase the resource quota of the cloud instance based on the quantity of resources required for scaling up the cloud instance. For example, it is assumed that a service load running on the cloud instance is relatively large, so that a memory quantity required for scaling up the cloud instance is 5 G. An original memory quota of the cloud instance is 1 G (namely, a memory quantity originally allocated to the cloud instance). The node agent may modify a cgroup configuration, so that a modified memory quota of the cloud instance is 6 G.

405: If the quantity of idle resources of the first worker node is less than the quantity of resources required for scale-up, the first worker node determines a to-be-migrated cloud instance from the plurality of cloud instances, where a priority of a service running on the to-be-migrated cloud instance is lower than a preset priority.

406: The first worker node migrates the to-be-migrated cloud instance to a second worker node, to update the quantity of idle resources of the first worker node.

If the quantity of idle resources of the first worker node is less than the quantity of resources required for scaling up the cloud instance, it indicates that the idle resources of the first worker node are insufficient, and the node agent may attempt to resolve a problem of resource insufficiency. To be specific, the node agent may determine at least one to-be-migrated cloud instance in the plurality of cloud instances of the first worker node. Priorities of services running on these to-be-migrated cloud instances are lower than the preset priority (that is, the priorities of services running on these cloud instances are usually lower). Therefore, the to-be-migrated cloud instances may be migrated to the second worker node. In this case, resources that are in the first worker node and that are allocated to the to-be-migrated cloud instances are released, and become new idle resources, so that the quantity of idle resources of the first worker node is updated (that is, the quantity of idle resources of the first worker node is increased).

It should be noted that, because a service running on the to-be-migrated cloud instance of the first worker node usually has a relatively low priority, a migration manner of the to-be-migrated cloud instance may be a cold migration. To be specific, a node agent of the first worker node sends a scheduling request to a master node, and the master node may select, based on the scheduling request, a worker node from other worker nodes than the first worker node as a migration destination, namely, the second worker node. Then, the master node may notify a node agent of the second worker node to create a new cloud instance, and control the new cloud instance to re-run the service running on the to-be-migrated cloud instance of the first worker node.

Finally, the master node may notify the node agent of the first worker node to release the to-be-migrated cloud instance, so that a resource allocated to the to-be-migrated cloud instance is released, and the quantity of idle resources of the first worker node is updated.

407: The first worker node detects whether the updated quantity of idle resources of the first worker node is greater than or equal to the quantity of resources required for scale-up.

After the quantity of idle resources of the first worker node is updated, the node agent may detect whether the updated quantity of idle resources of the first worker node is greater than or equal to the quantity of resources required for scale-up. If the updated quantity of idle resources of the first worker node is greater than or equal to the quantity of resources required for scaling up the cloud instance, step 408 is performed. If the updated quantity of idle resources of the first worker node is less than the quantity of resources required for scaling up the cloud instance, step 410 is performed.

408: If an updated quantity of idle resources of the first worker node is greater than or equal to the quantity of resources required for scale-up, the first worker node increases the resource quota of the to-be-scaled-up cloud instance based on the quantity of resources required for scale-up.

If the updated quantity of idle resources of the first worker node is greater than or equal to the quantity of resources required for scaling up the cloud instance, it indicates that the updated idle resources of the first worker node are sufficient, and the cloud instance may be directly scaled up by using the resources. Therefore, the node agent may increase the resource quota of the cloud instance based on the quantity of resources required for scaling up the cloud instance.

409: The first worker node sends the resource quota of the to-be-scaled-up cloud instance to the master node.

After increasing the resource quota of the cloud instance, the node agent may send the increased resource quota of the cloud instance to the master node. Therefore, the master node and the first worker node may synchronize the resource quota of the cloud instance, so that global (namely, the entire cloud service system) resource configuration information is accurate and consistent.

410: If the updated quantity of idle resources of the first worker node is less than the quantity of resources required for scale-up, the first worker node detects a type of a service running on the to-be-scaled-up cloud instance.

411: If the service running on the to-be-scaled-up cloud instance is a stateless application, the first worker node creates a new cloud instance on the third worker node, where the new cloud instance and the to-be-scaled-up cloud instance are jointly used to run the stateless application.

412: If the service running on the to-be-scaled-up cloud instance is a stateful application, the first worker node migrates the to-be-scaled-up cloud instance to the third worker node.

If the updated quantity of idle resources of the first worker node is less than the quantity of resources required for scaling up the cloud instance, it indicates that the updated quantity of idle resources of the first worker node is insufficient, and the node agent needs to resolve the problem of resource insufficiency again. The node agent may first detect a type of a service running on the cloud instance (which may also be understood as an application running on the cloud instance), to perform corresponding processing based on the type of the service running on the cloud instance.

If the service running on the cloud instance is a stateless application, the node agent may apply for creating a new cloud instance on the third worker node. In this case, the cloud instance and the new cloud instance may jointly run a service originally running on the cloud instance, which is equivalent to implementing scale-up. Specifically, the node agent of the first worker node determines that the service running on the cloud instance is a stateless application, and may send a scheduling request to the master node. The master node may select, based on the scheduling request, a worker node, namely, a third worker node, from other worker nodes than the first worker node. Then, the master node may notify a node agent of the third worker node to create a new cloud instance, and control the new cloud instance to run a service running on the cloud instance of the first worker node. Because the service is a stateless application, running performed by different cloud instances has similar effects. Therefore, although the new cloud instance and the cloud instance are located on different co-located nodes, the new cloud instance and the cloud instance may jointly bear the service, which is equivalent to completing scale-up.

If the service running on the cloud instance is a stateful application, the node agent may migrate the cloud instance to the third worker node, where a quantity of idle resources of the third worker node is greater than or equal to the quantity of resources required for scaling up the cloud instance. In this case, after the cloud instance is migrated to the third worker node, a resource quota of the cloud instance may be increased, which is equivalent to completing scale-up. Specifically, a manner of migrating the cloud instance to the third worker node may be a hot migration or a cold migration. The following separately describes two manners: (1) A hot migration manner is as follows: The node agent of the first worker node determines that a service running on the cloud instance is a stateful application, and may send a scheduling request to the master node. The master node may select, based on the scheduling request, a worker node from other worker nodes than the first worker node as a migration destination, namely, the third worker node. Then, the master node may notify the node agent of the third worker node to create a new cloud instance, and keep a service status of the new cloud instance consistent with a service status of the cloud instance. In this way, the new cloud instance is controlled to continue to run a service running on the cloud instance in the first worker node. Finally, the master node may notify the node agent of the first worker node to release the cloud instance. The node agent of the third worker node may make a resource quota of the new cloud instance greater than the resource quota of the cloud instance in the first worker node, which is equivalent to completing scale-up. (2) A cold migration manner is as follows: The node agent of the first worker node determines that a service running on the cloud instance is a stateful application, and may send a scheduling request to the master node. The master node may select, based on the scheduling request, a worker node from other worker nodes than the first worker node as a migration destination, namely, the third worker node. Then, the master node may notify the node agent of the third worker node to create a new cloud instance, and control the new cloud instance to re-run the service running on the cloud instance in the first worker node. Finally, the master node may notify the node agent of the first worker node to release the cloud instance. The node agent of the third worker node may make a resource quota of the new cloud instance greater than the resource quota of the cloud instance in the first worker node, which is equivalent to completing scale-up.

It should be understood that this embodiment is described by using only one cloud instance of the first worker node as an example. Other cloud instances of the first worker node may also perform operations similar to those performed by the cloud instance. That is, for each cloud instance of the first worker node, the operations described in step 401 to step 412 may be performed. Details are not described herein again.

In this embodiment of this application, after obtaining the status information of the plurality of cloud instances, the first worker node may determine, based on the status information, a to-be-scaled-up cloud instance from the plurality of cloud instances and a quantity of resources required for scale-up. If a quantity of idle resources of the first worker node is greater than or equal to the quantity of resources required for scale-up, the first worker node may increase a resource quota of the to-be-scaled-up cloud instance based on the quantity of resources required for scale-up. It can be learned from the foregoing process that, this application provides a new cloud instance scale-up mechanism. After determining a to-be-scaled-up cloud instance, the first worker node may increase a resource quota of the to-be-scaled-up cloud instance by modifying a cgroup configuration in real time. This is not perceived by a service running on the to-be-scaled-up cloud instance. Therefore, the service running on the to-be-scaled-up cloud instance is not interrupted.

Further, in the VPA, if a resource quota of a cloud instance needs to be increased, the worker node can modify the resource quota of the cloud instance only when the cloud instance is reconstructed. However, reconstruction of cloud instance usually requires waiting for a specific occasion, for example, being evicted or ended. This part of time is usually uncontrollable, and consequently, duration required for increasing the resource quota of the cloud instance is excessively long. However, in this embodiment of this application, the resource quota of the cloud instance does not need to be modified during cloud instance reconstruction, and the resource quota of the cloud instance may be modified in real time. This effectively shortens the duration required for increasing the resource quota of the cloud instance.

Further, in the VPA, if a resource quota of a cloud instance needs to be increased, the worker node can modify the resource quota of the cloud instance only when the cloud instance is reconstructed. In addition, cloud instance reconstruction and service startup usually require a relatively long time, and consequently, duration required for increasing the resource quota of the cloud instance is excessively long. However, in this embodiment of this application, the resource quota of the cloud instance does not need to be modified during cloud instance reconstruction, and the resource quota of the cloud instance may be modified in real time. This effectively shortens the duration required for increasing the resource quota of the cloud instance.

Further, in the VPA, whether a cloud instance needs to be scaled up is detected only based on a resource utilization rate of the cloud instance, and a service requirement cannot be deeply understood. A plurality of detections are required to accurately determine whether a cloud instance needs to be scaled up, which consumes a relatively long time in detection. In this embodiment of this application, whether the cloud instance needs to be scaled up may be detected based on the status information of the cloud instance. The status information of the cloud instance includes information such as a resource utilization rate, a load degree, and a service success rate of the cloud instance, and the status information of the cloud instance is related to service logic of the cloud instance, so that a service requirement can be reflected. Therefore, the worker node can sense the service requirement in real time based on the status information of the cloud instance, and accurately detect, based on the service requirement, whether the cloud instance needs to be scaled up. This effectively reduces a quantity of detection times and shortens detection duration.

Figure 5:
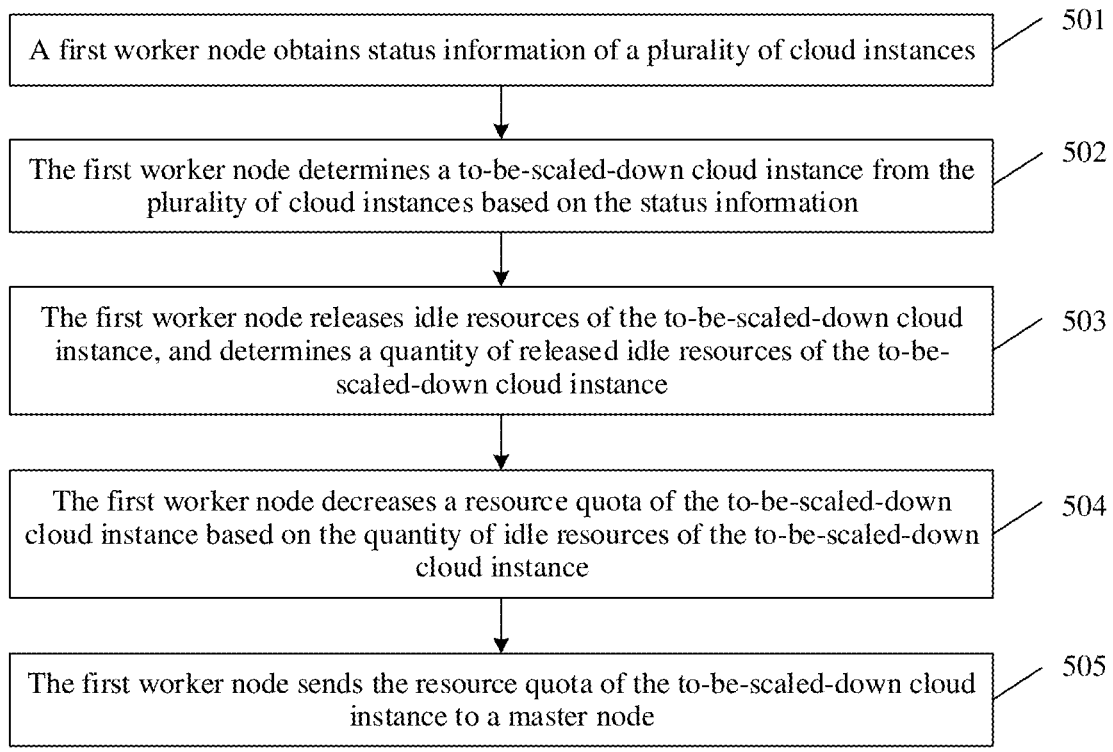
FIG. 5 is a schematic flowchart of a cloud instance scale-down method according to an embodiment of this application.

The foregoing describes in detail a scale-up process of the cloud instance, and the following describes a scale-down process of the cloud instance. FIG. 5 is a schematic flowchart of a cloud instance scale-down method according to an embodiment of this application. It should be noted that the method may be applied to the cloud service system shown in FIG. 2 or FIG. 3. The method may be executed by any one of a plurality of worker nodes in the cloud service system. The worker node is referred to as a first worker node below. As shown in FIG. 5, the method includes the following steps.

501: A first worker node obtains status information of a plurality of cloud instances.

502: The first worker node determines a to-be-scaled-down cloud instance from the plurality of cloud instances based on the status information.

In this embodiment, a plurality of cloud instances are deployed on the first worker node. For any cloud instance, the cloud instance may periodically obtain status information of the cloud instance, to determine, based on the status information of the cloud instance, whether scale-down needs to be performed.

Further, the status information of the cloud instance may include at least one of the following: a resource utilization rate of the cloud instance, a load degree of the cloud instance, and a service success rate of the cloud instance.

Further, the resource utilization rate of the cloud instance may include at least one of the following: a CPU usage of the cloud instance, a memory usage of the cloud instance, storage IOPS of the cloud instance, network IOPS of the cloud instance, and the like.

Further, the load degree of the cloud instance may include at least one of the following: a task response time of the cloud instance, a task processing delay of the cloud instance, a database indicator of the cloud instance, a message queue indicator of the cloud instance, a task queue length of the cloud instance, and the like.

Further, the service success rate of the cloud instance may include at least one of the following: a task completion rate of the cloud instance, a message transmission success rate of the cloud instance, and the like.

Specifically, the cloud instance may determine, in the following manner, whether scale-down needs to be performed.

The cloud instance may detect whether the status information of the cloud instance meets a preset scale-down condition. If the status information of the cloud instance meets the preset scale-down condition, it is determined that scale-down needs to be performed, that is, the cloud instance is determined as a to-be-scaled-down cloud instance. If the status information of the cloud instance does not meet the preset scale-down condition, it is determined that scale-down does not need to be performed, and the operation ends.

That the status information of the cloud instance meets the preset scale-down condition may include at least one of the following cases: the resource utilization rate of the cloud instance is less than a preset second resource utilization rate, the load degree of the cloud instance is less than a preset second load degree, and a service success rate of the cloud instance is greater than or equal to a preset second service success rate. It should be noted that the preset second resource utilization rate may be understood as a resource utilization rate threshold that meets a scale-down requirement, the preset second load degree may be understood as a load degree threshold that meets the scale-down requirement, and the preset second service success rate may be understood as a service success rate threshold that meets the scale-down requirement. Values of the three thresholds may be set based on an actual requirement, and are not limited herein.

> 503: The first worker node releases idle resources of the to-be-scaled-down cloud instance, and determines a quantity of released idle resources of the to-be-scaled-down cloud instance.

After determining that scale-down needs to be performed, the cloud instance may release idle resources of the cloud instance (that is, resources that are not used by the cloud instance, and resources occupied by the cloud instance for running a service are non-idle resources of the cloud instance), and after completing the release, calculate a quantity of idle resources of the cloud instance (namely, a size of the resources released by the cloud instance).

It should be noted that, when the cloud instance determines that a service running on the cloud instance decreases and needs to be scaled down, the cloud instance may attempt to perform scale-down in the following manner: (1) For a system-level language, memory is managed by a service, and most part of memory can be collected in time through dynamic allocation and release. Another part of memory is managed through a memory pool. The memory pool is reduced when a service load is small, and the memory pool is expanded when the service load is large. (2) For an advanced language with garbage collection, memory collection is performed by the advanced language when the advanced language is running. However, the memory collection of the advanced language is not synchronized with the service load. In this case, the service can invoke forcible garbage collection to release the memory.

After obtaining the quantity of idle resources of the cloud instance, the cloud instance sends the quantity of idle resources of the cloud instance to a node agent of the first worker node.

> 504: The first worker node decreases a resource quota of the to-be-scaled-down cloud instance based on the quantity of idle resources of the to-be-scaled-down cloud instance.

After determining the quantity of idle resources of the cloud instance, the node agent may decrease the resource quota of the cloud instance based on the quantity of idle resources of the cloud instance. For example, it is assumed that a service load running on the cloud instance is relatively small, so that an idle memory quantity of the cloud instance is 2 G. An original memory quota of the cloud instance is 5 G (namely, a memory quantity originally allocated to the cloud instance). The node agent may modify a cgroup configuration, so that a modified memory quota of the cloud instance is 3 G.

> 505: The first worker node sends the resource quota of the to-be-scaled-down cloud instance to a master node.

After decreasing the resource quota of the cloud instance, the node agent may send the decreased resource quota of the cloud instance to the master node. Therefore, the master node and the first worker node may synchronize the resource quota of the cloud instance, so that global (namely, the entire cloud service system) resource configuration information is accurate and consistent.

It should be understood that this embodiment is described by using only one cloud instance of the first worker node as an example. Other cloud instances of the first worker node may also perform operations similar to those performed by the cloud instance. That is, for each cloud instance of the first worker node, the operations described in step 501 to step 502 may be performed, and details are not described herein again.

In this embodiment of this application, after obtaining the status information of the plurality of cloud instances, the first worker node may determine the to-be-scaled-down cloud instance from the plurality of cloud instances based on the status information. Then, the first worker node releases the idle resources of the to-be-scaled-down cloud instance, and determines the quantity of released idle resources of the to-be-scaled-down cloud instance. Finally, the first worker node may decrease the resource quota of the to-be-scaled-down cloud instance based on the quantity of idle resources of the to-be-scaled-down cloud instance. It can be learned from the foregoing process that, this application provides a new cloud instance scale-down mechanism. After determining a to-be-scaled-down cloud instance, the first worker node may decrease a resource quota of the to-be-scaled-down cloud instance by modifying a cgroup configuration in real time. This is not perceived by a service running on the to-be-scaled-down cloud instance. Therefore, the service running on the to-be-scaled-down cloud instance is not interrupted.

Further, before the resource quota of the to-be-scaled-down cloud instance is decreased, the to-be-scaled-down cloud instance may be enabled to release idle resources by itself, to ensure a success rate of modifying the resource quota of the to-be-scaled-down cloud instance.

Further, in VPA, if a resource quota of a cloud instance needs to be decreased, the worker node can modify the resource quota of the cloud instance only when the cloud instance is reconstructed. However, reconstruction of cloud instance usually requires waiting for a specific occasion, for example, being evicted or ended. This part of time is usually uncontrollable, and consequently, duration required for decreasing the resource quota of the cloud instance is excessively long. However, in this embodiment of this application, the resource quota of the cloud instance does not need to be modified during cloud instance reconstruction, and the resource quota of the cloud instance may be modified in real time. This effectively shortens the duration required for decreasing the resource quota of the cloud instance.

Further, in the VPA, if a resource quota of a cloud instance needs to be decreased, the worker node can modify the resource quota of the cloud instance only when the cloud instance is reconstructed. In addition, cloud instance reconstruction and service startup usually require a relatively long time, and consequently, duration required for decreasing the resource quota of the cloud instance is excessively long. However, in this embodiment of this application, the resource quota of the cloud instance does not need to be modified during cloud instance reconstruction, and the resource quota of the cloud instance may be modified in real time. This effectively shortens the duration required for decreasing the resource quota of the cloud instance.

Further, in the VPA, whether a cloud instance needs to be scaled down is detected only based on a resource utilization rate of the cloud instance, and a service requirement cannot be deeply understood. A plurality of detections are required to accurately determine whether a cloud instance needs to be scaled down, which consumes a relatively long time in detection. In this embodiment of this application, whether the cloud instance needs to be scaled down may be detected based on the status information of the cloud instance. The status information of the cloud instance includes information such as a resource utilization rate, a load degree, and a service success rate of the cloud instance, and the status information of the cloud instance is related to service logic of the cloud instance, so that a service requirement can be reflected. Therefore, the worker node can sense the service requirement in real time based on the status information of the cloud instance, and accurately detect, based on the service requirement, whether the cloud instance needs to be scaled down. This effectively reduces a quantity of detection times and shortens detection duration.

Figure 6:
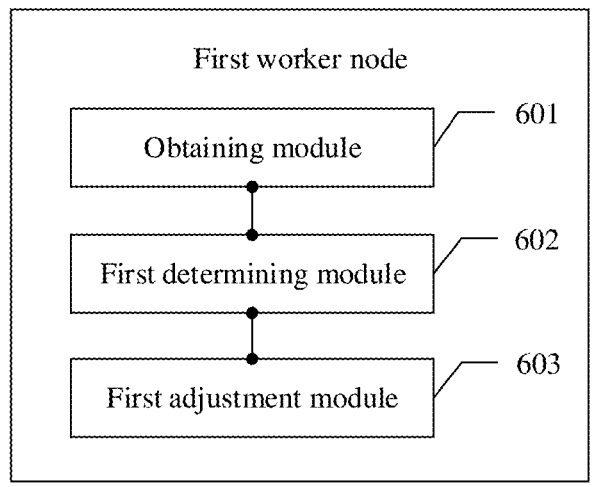
FIG. 6 is a schematic diagram of a structure of a worker node according to an embodiment of this application.

The foregoing describes in detail the cloud instance scale-down method provided in embodiments of this application. The following describes a worker node provided in embodiments of this application. FIG. 6 is a schematic diagram of a structure of a worker node according to an embodiment of this application. As shown in FIG. 6, the worker node is used as a first worker node. The first worker node is disposed in a cloud service system, a plurality of cloud instances are deployed on the first worker node, and the first worker node includes:

an obtaining module 601, configured to obtain status information of the plurality of cloud instances;

a first determining module 602, configured to determine, based on the status information, a to-be-scaled-up cloud instance from the plurality of cloud instances and a quantity of resources required for scale-up; and a first adjustment module 603, configured to: if a quantity of idle resources of the first worker node is greater than or equal to the quantity of resources required for scale-up, increase a resource quota of the to-be-scaled-up cloud instance based on the quantity of resources required for scale-up.

In this embodiment of this application, after obtaining the status information of the plurality of cloud instances, the first worker node may determine, based on the status information, a to-be-scaled-up cloud instance from the plurality of cloud instances and a quantity of resources required for scale-up. If a quantity of idle resources of the first worker node is greater than or equal to the quantity of resources required for scale-up, the first worker node may increase a resource quota of the to-be-scaled-up cloud instance based on the quantity of resources required for scale-up. It can be learned from the foregoing process that, this application provides a new cloud instance scale-up mechanism. After determining a to-be-scaled-up cloud instance, the first worker node may increase a resource quota of the to-be-scaled-up cloud instance by modifying a cgroup configuration in real time. This is not perceived by a service running on the to-be-scaled-up cloud instance. Therefore, the service running on the to-be-scaled-up cloud instance is not interrupted.

In a possible implementation, the first determining module 602 is configured to: determine a cloud instance whose status information meets a preset scale-up condition as a to-be-scaled-up cloud instance from the plurality of cloud instances; and determine the quantity of resources required for scale-up based on status information of the to-be-scaled-up cloud instance.

In a possible implementation, the cloud service system further includes a second worker node, and the first worker node further includes:

a second determining module, configured to: if the quantity of idle resources of the first worker node is less than the quantity of resources required for scale-put, determine a to-be-migrated cloud instance from the plurality of cloud instances, where a priority of a service running on the to-be-migrated cloud instance is lower than a preset priority; a first migration module, configured to migrate the to-be-migrated cloud instance to the second worker node, to update the quantity of idle resources of the first worker node; and a second adjustment module, configured to: if an updated quantity of idle resources of the first worker node is greater than or equal to the quantity of resources required for scale-up, increase a resource quota of the to-be-scaled-up cloud instance based on the quantity of resources required for scale-up.

In a possible implementation, the cloud service system further includes a third worker node, and the first worker node further includes: a detection module, configured to: if the updated quantity of idle resources of the first worker node is less than the quantity of resources required for scale-up, detect, by the first worker node, a type of a service running on the to-be-scaled-up cloud instance; a creation module, configured to: if the service running on the to-be-scaled-up cloud instance is a stateless application, create a new cloud instance on the third worker node, where the new cloud instance and the to-be-scaled-up cloud instance are jointly used to run the stateless application; and a second migration module, configured to: if the service running on the to-be-scaled-up cloud instance is a stateful application, migrate the to-be-scaled-up cloud instance to the third worker node.

In a possible implementation, the status information includes at least one of the following: a resource utilization rate, a load degree, and a service success rate.

In a possible implementation, the preset scale-up condition includes at least one of the following: the resource utilization rate is greater than or equal to a preset first resource utilization rate, the load degree is greater than or equal to a preset first load degree, and the service success rate is less than a preset first service success rate.

In a possible implementation, the foregoing migration is a cold migration or a hot migration.

In a possible implementation, the cloud service system further includes a master node, and the first worker node further includes a feedback module, configured to send the resource quota of the to-be-scaled-up cloud instance to the master node.

Figure 7:
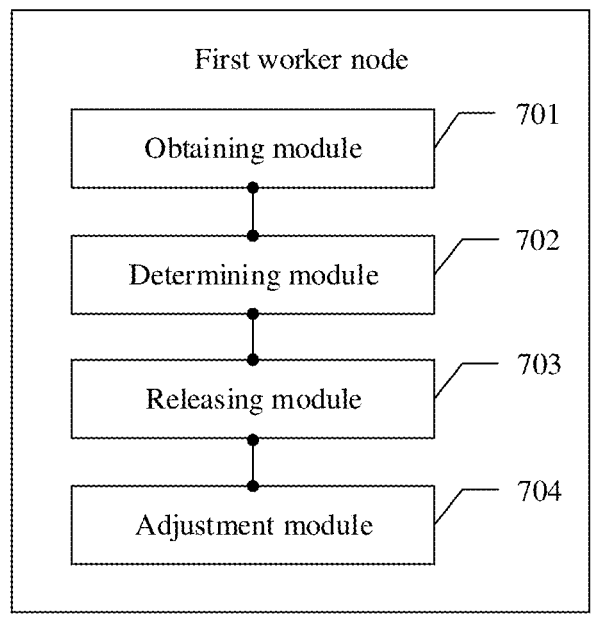
FIG. 7 is a schematic diagram of another structure of a worker node according to an embodiment of this application.

FIG. 7 is a schematic diagram of another structure of a worker node according to an embodiment of this application. As shown in FIG. 7, the worker node is used as a first worker node. The first worker node is disposed in a cloud service system, a plurality of cloud instances are deployed on the first worker node, and the first worker node includes:

an obtaining module 701, configured to obtain status information of the plurality of cloud instances;

a determining module 702, configured to determine a to-be-scaled-down cloud instance from the plurality of cloud instances based on the status information;

a releasing module 703, configured to release idle resources of the to-be-scaled-down cloud instance, and determine a quantity of released idle resources of the to-be-scaled-down cloud instance; and an adjustment module 704, configured to decrease a resource quota of the to-be-scaled-down cloud instance based on the quantity of idle resources of the to-be-scaled-down cloud instance.

In this embodiment of this application, after obtaining the status information of the plurality of cloud instances, the first worker node may determine the to-be-scaled-down cloud instance from the plurality of cloud instances based on the status information. Then, the first worker node releases the idle resources of the to-be-scaled-down cloud instance, and determines the quantity of released idle resources of the to-be-scaled-down cloud instance. Finally, the first worker node may decrease the resource quota of the to-be-scaled-down cloud instance based on the quantity of idle resources of the to-be-scaled-down cloud instance. It can be learned from the foregoing process that, this application provides a new cloud instance scale-down mechanism. After determining a to-be-scaled-down cloud instance, the first worker node may decrease a resource quota of the to-be-scaled-down cloud instance by modifying a cgroup configuration in real time. This is not perceived by a service running on the to-be-scaled-down cloud instance. Therefore, the service running on the to-be-scaled-down cloud instance is not interrupted.

In a possible implementation, the determining module 702 is configured to determine a cloud instance whose status information meets a preset scale-down condition as a to-be-scaled-down cloud instance from the plurality of cloud instances.

In a possible implementation, the status information includes at least one of the following: a resource utilization rate, a load degree, and a service success rate.

In a possible implementation, the preset scale-down condition includes at least one of the following: the resource utilization rate is less than a preset second resource utilization rate, the load degree is less than a preset second load degree, and the service success rate is greater than or equal to a preset second service success rate.

In a possible implementation, the cloud service system further includes a master node, and the first worker node further includes a feedback module, configured to send a resource quota of the to-be-scaled-up cloud instance to the master node.

It should be noted that content such as information exchange between the modules/units of the apparatus and the execution processes thereof is based on the same idea as that of the method embodiments of this application, and produces the same technical effects as that of the method embodiments of this application. For specific content, refer to the foregoing descriptions in the method embodiments of this application. Details are not described herein again.

Figure 8:
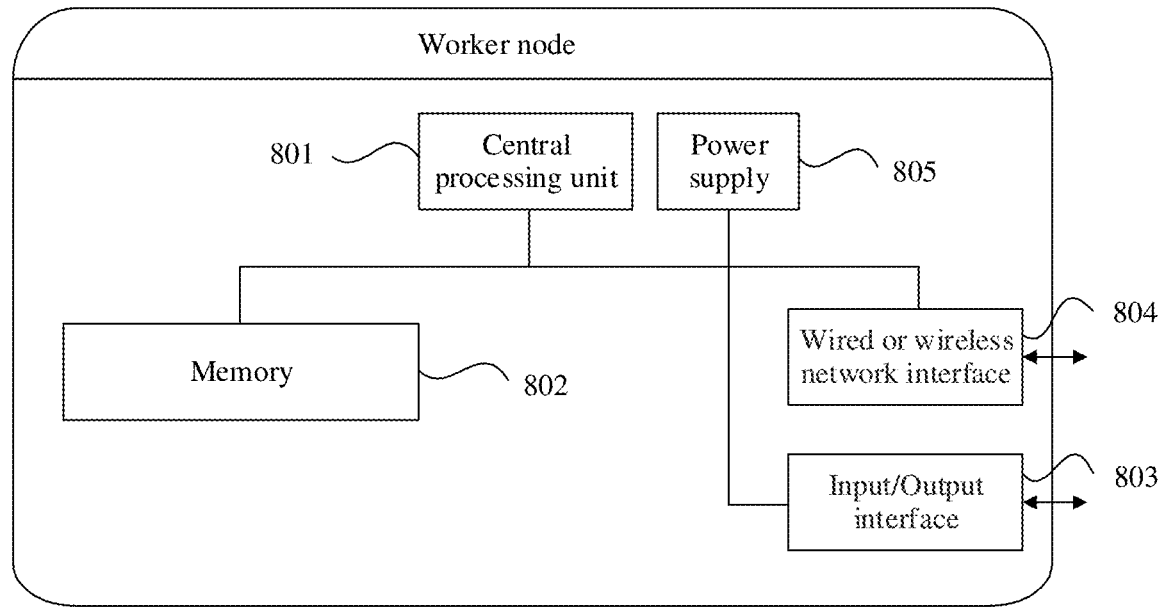
FIG. 8 is a schematic diagram of another structure of a worker node according to an embodiment of this application.

FIG. 8 is a schematic diagram of another structure of a worker node according to an embodiment of this application. As shown in FIG. 8, the worker node is used as a first worker node. The first worker node is disposed in a cloud service system. A plurality of cloud instances are deployed on the first worker node. The first worker node may include one or more central processing units 801, memories 802, input/output interfaces 803, wired or wireless network interfaces 804, and power supplies 805.

The memory 802 may perform transient storage or persistent storage. Further, the central processing unit 801 may be configured to communicate with the memory 802, and perform, on the first worker node, a series of instruction operations in the memory 802.

In this embodiment, the central processing unit 801 may perform operations performed by the first worker node in the embodiment shown in FIG. 4A and FIG. 4B or FIG. 5. Details are not described herein again.

In this embodiment, specific functional module division in the central processing unit 801 may be similar to division manners of modules such as the obtaining module, the first determining module, the second adjustment module, the second determining module, the first migration module, the second adjustment module, the detection module, the creation module, the second migration module, and the feedback module that are described in FIG. 6. Details are not described herein again.

Specific functional module division in the central processing unit 801 may be similar to division manners of modules such as the obtaining module, the determining module, the releasing module, the adjustment module, and the feedback module described in FIG. 7. Details are not described herein again.

Embodiments of this application further relate to a computer storage medium, including computer-readable instructions. When the computer-readable instructions are executed, the steps performed by a first worker node in the embodiment shown in FIG. 5 are implemented.

Embodiments of this application further relate to a computer program product, including instructions. When the computer program product runs on a computer, the computer is enabled to perform the steps performed by the first server in the embodiment shown in FIG. 5, or implement the steps performed by the arbiter in the embodiment shown in FIG. 5.

It may be clearly understood by a person skilled in the art that, for the purpose of convenient and brief description, for a detailed working process of the foregoing systems, apparatuses, and units, reference may be made to a corresponding process in the foregoing method embodiments. Details are not described herein again.

In several embodiments provided in this application, it should be understood that the disclosed system, apparatus, and method may be implemented in other manners. For example, the described apparatus embodiments are merely examples. For example, division of units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or a part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

What is claimed is:

1. A cloud instance scale-up method, wherein the method is applied to a cloud service system that comprises a first worker node on which a plurality of cloud instances are deployed, and the method comprises:
   obtaining, by the first worker node, status information of the plurality of cloud instances;
   determining, by the first worker node based on the status information, a to-be-scaled-up cloud instance from the plurality of cloud instances and a quantity of resources required for scale-up; and
   if a quantity of idle resources of the first worker node is greater than or equal to the quantity of resources required for scale-up, increasing, by the first worker node, a resource quota of the to-be-scaled-up cloud instance based on the quantity of resources required for scale-up.

2. The method according to claim 1, wherein the determining, by the first worker node based on the status information, a to-be-scaled-up cloud instance from the plurality of cloud instances and a quantity of resources required for scale-up comprises:
   determining, by the first worker node, a cloud instance whose status information meets a preset scale-up condition as the to-be-scaled-up cloud instance; and
   determining, by the first worker node, the quantity of resources required for scale-up based on status information of the to-be-scaled-up cloud instance.

3. The method according to claim 2, wherein the status information comprises at least one of: a resource utilization rate, a load degree, and a service success rate.

4. The method according to claim 3, wherein the preset scale-up condition comprises at least one of: the resource utilization rate is greater than or equal to a preset first resource utilization rate, the load degree is greater than or equal to a preset first load degree, and the service success rate is less than a preset first service success rate.

5. The method according to claim 1, wherein the cloud service system further comprises a second worker node, and the method further comprises:
   if the quantity of idle resources of the first worker node is less than the quantity of resources required for scale-up, determining, by the first worker node, a to-be-migrated cloud instance from the plurality of cloud instances, wherein a priority of a service running on the to-be-migrated cloud instance is lower than a preset priority;
   migrating, by the first worker node, the to-be-migrated cloud instance to the second worker node, and correspondingly updating the quantity of idle resources of the first worker node; and
   if an updated quantity of idle resources of the first worker node is greater than or equal to the quantity of resources required for scale-up, increasing, by the first worker node, a resource quota of the to-be-scaled-up cloud instance based on the quantity of resources required for scale-up.

6. The method according to claim 5, wherein the cloud service system further comprises a third worker node, and the method further comprises:
   if the updated quantity of idle resources of the first worker node is less than the quantity of resources required for scale-up, detecting, by the first worker node, a type of a service running on the to-be-scaled-up cloud instance;
   if the service running on the to-be-scaled-up cloud instance is a stateless application, creating, by the first worker node, a new cloud instance on the third worker node, and the new cloud instance and the to-be-scaled-up cloud instance are jointly used to run the stateless application; and
   if the service running on the to-be-scaled-up cloud instance is a stateful application, migrating, by the first worker node, the to-be-scaled-up cloud instance to the third worker node.

7. The method according to claim 6, wherein the migration is a cold migration or a hot migration.

8. The method according to claim 1, wherein the cloud service system further comprises a master node, and after the increasing, by the first worker node, a resource quota of the to-be-scaled-up cloud instance, the method further comprises:
   sending, by the first worker node, the resource quota of the to-be-scaled-up cloud instance to the master node.

9. A cloud instance scale-down method, wherein the method is applied to a cloud service system that comprises a first worker node on which a plurality of cloud instances are deployed, and the method comprises:
   obtaining, by the first worker node, status information of the plurality of cloud instances;
   determining, by the first worker node, a to-be-scaled-down cloud instance from the plurality of cloud instances based on the status information;
   releasing, by the first worker node, idle resources of the to-be-scaled-down cloud instance, and determining a quantity of released idle resources of the to-be-scaled-down cloud instance; and
   decreasing, by the first worker node, a resource quota of the to-be-scaled-down cloud instance based on the quantity of idle resources of the to-be-scaled-down cloud instance.

10. The method according to claim 9, wherein the determining, by the first worker node, a to-be-scaled-down cloud instance from the plurality of cloud instances based on the status information comprises:
    determining, by the first worker node, a cloud instance whose status information meets a preset scale-down condition as a to-be-scaled-down cloud instance from the plurality of cloud instances.

11. The method according to claim 9, wherein the status information comprises at least one of: a resource utilization rate, a load degree, and a service success rate.

12. The method according to claim 11, wherein the preset scale-down condition comprises at least one of: the resource utilization rate is less than a preset second resource utilization rate, the load degree is less than a preset second load degree, and the service success rate is greater than or equal to a preset second service success rate.

13. The method according to claim 9, wherein the cloud service system further comprises a master node, and after the decreasing, by the first worker node, a resource quota of the to-be-scaled-down cloud instance based on the quantity of idle resources of the to-be-scaled-down cloud instance, the method further comprises:

sending, by the first worker node, the resource quota of the to-be-scaled-down cloud instance to the master node.

14. A worker node configured to operate in a cloud service system, the worker node comprising a memory and a processor, wherein the memory stores program code, and the processor is configured to execute the program code to perform operations comprising:

obtaining status information of a plurality of cloud instances deployed on the worker node;

determining, based on the status information, a to-be-scaled-up cloud instance from the plurality of cloud instances and a quantity of resources required for scale-up; and if a quantity of idle resources of the worker node is greater than or equal to the quantity of resources required for scale-up, increasing a resource quota of the to-be-scaled-up cloud instance based on the quantity of resources required for scale-up.

15. The worker node according to claim 14, wherein the determining, based on the status information, a to-be-scaled-up cloud instance from the plurality of cloud instances and a quantity of resources required for scale-up comprises:

determining a cloud instance whose status information meets a preset scale-up condition as a to-be-scaled-up cloud instance from the plurality of cloud instances; and determining the quantity of resources required for scale-up based on status information of the to-be-scaled-up cloud instance.

16. The worker node according to claim 14, wherein the cloud service system further comprises a second worker node, and the processor is configured to perform operations further comprising:

if the quantity of idle resources of the first-worker node is less than the quantity of resources required for scale-up, determining a to-be-migrated cloud instance from the plurality of cloud instances, wherein a priority of a service running on the to-be-migrated cloud instance is lower than a preset priority;

migrating the to-be-migrated cloud instance to the second worker node, to update the quantity of idle resources of the worker node; and if an updated quantity of idle resources of the worker node is greater than or equal to the quantity of resources required for scale-up, increasing a resource quota of the to-be-scaled-up cloud instance based on the quantity of resources required for scale-up.

17. The worker node according to claim 16, wherein the cloud service system further comprises a third worker node, and the operations further comprise:

if the updated quantity of idle resources of the worker node is less than the quantity of resources required for scale-up, detecting a type of a service running on the to-be-scaled-up cloud instance;

if the service running on the to-be-scaled-up cloud instance is a stateless application, creating a new cloud instance on the third worker node, and the new cloud instance and the to-be-scaled-up cloud instance are jointly used to run the stateless application; and if the service running on the to-be-scaled-up cloud instance is a stateful application, migrating the to-be-scaled-up cloud instance to the third worker node.

18. A worker node configured to operate in a cloud service system, the worker node comprises a memory and a processor, wherein the memory stores program code, and the processor is configured to execute the program code to perform operations comprising:

obtaining status information of a plurality of cloud instances deployed on the worker node;

determining a to-be-scaled-down cloud instance from the plurality of cloud instances based on the status information;

releasing idle resources of the to-be-scaled-down cloud instance, and determining a quantity of released idle resources of the to-be-scaled-down cloud instance; and decreasing a resource quota of the to-be-scaled-down cloud instance based on the quantity of idle resources of the to-be-scaled-down cloud instance.

19. A non-transitory computer storage medium storing one or more instructions that, when executed by one or more computers, cause the one or more computers to perform the method according to claim 1.

20. A non-transitory computer program product storing instructions that, when executed by a computer, cause the computer to perform the method according to claim 1.

* * * * *